United States Patent [19]

Tanaka

[11] Patent Number: 4,977,988

[45] Date of Patent: Dec. 18, 1990

[54] CONTROL SYSTEM FOR A CLUTCH FOR A VEHICLE

[75] Inventor: Hiroshi Tanaka, Musashino, Japan

[73] Assignee: Fuji Jukogyo Kabushiki Kaisha, Tokyo, Japan

[21] Appl. No.: 417,833

[22] Filed: Oct. 6, 1989

[30] Foreign Application Priority Data

Oct. 18, 1988 [JP] Japan .................................. 63-262089

[51] Int. Cl.$^5$ ............................................. B60K 41/28
[52] U.S. Cl. .............................. 192/0.052; 192/0.092; 192/21.5
[58] Field of Search ................. 192/0.052, 0.092, 3.56, 192/21.5, 30 W

[56] References Cited

U.S. PATENT DOCUMENTS 4,475,637 10/1984 Oguma et al. .................... 192/0.052

FOREIGN PATENT DOCUMENTS 60-256632 12/1985 Japan .

Primary Examiner—Richard Lorence
Attorney, Agent, or Firm—Martin A. Farber

[57] ABSTRACT

A system for disengaging an electromagnetic clutch upon selection of an opposite driving range of an automatic transmission. When a forward driving range is selected during rearward driving or a rearward driving range is selected during forward driving, a loading shift signal is produced. In response to the loading shift signal at a vehicle speed higher than a clutch engaging vehicle speed, the electromagnetic clutch is disengaged in order to prevent the engine from stalling.

4 Claims, 6 Drawing Sheets

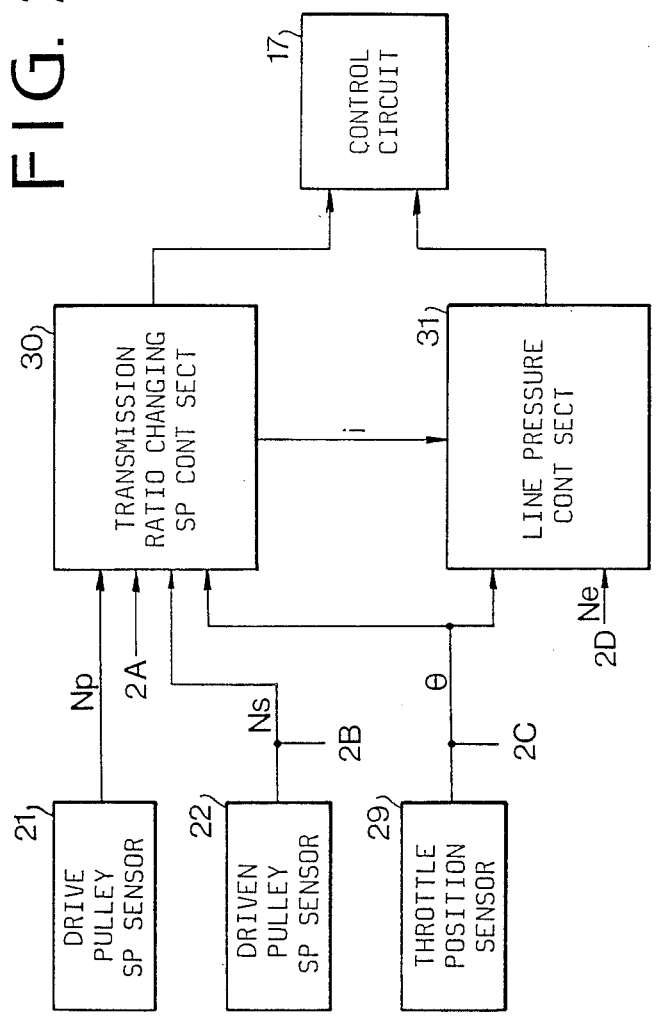

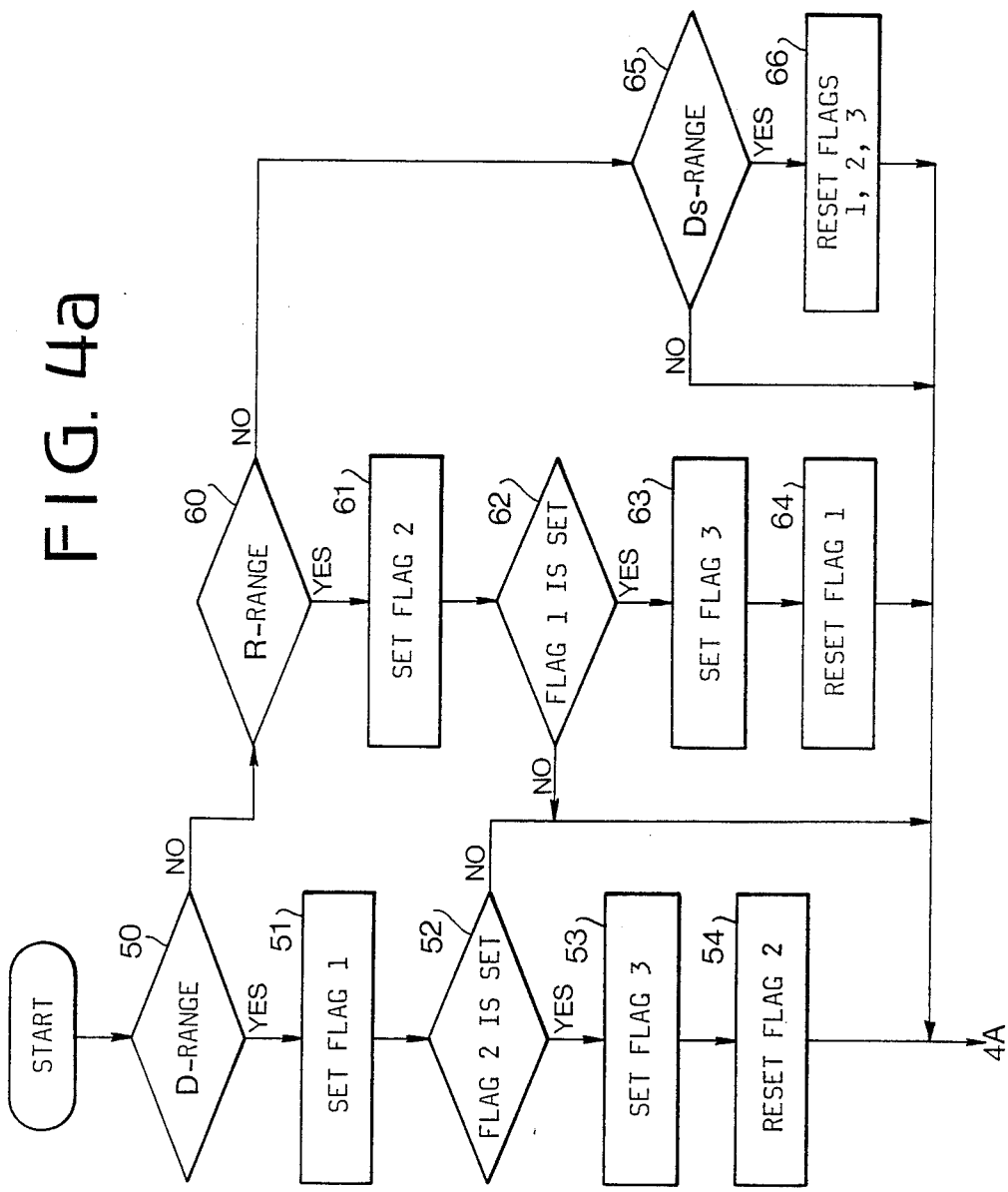

CONTROL SYSTEM FOR A CLUTCH FOR A VEHICLE

BACKGROUND OF THE INVENTION

The present invention relates to a control system for an automatic clutch such as an electromagnetic clutch for an automatic transmission of a motor vehicle.

An automobile provided with a continuously variable belt-drive transmission with an electromagnetic clutch is disclosed by the applicant of the present patent application. The electromagnetic clutch of the transmission is controlled by a control system to provide various operational modes such as a starting mode of a vehicle, reverse excitation mode, drag mode at release of an accelerator pedal of a vehicle, and mode of lock-up engagement. One of the modes is selected in accordance with a position of a selector lever and driving conditions to control the electromagnetic clutch.

Japanese Patent Application Laid-Open 60-256632 discloses a control system for an electromagnetic clutch wherein the clutch torque is generated to engage the clutch when vehicle speed is higher than a predetermined clutch engaging reference speed, even if the accelerator pedal is released, thereby producing an engine braking effect.

However, when a select lever is shifted to a reverse position during forward driving or to the drive position during rearward driving, which is hereinafter called loading shift, the clutch torque is generated to engage the clutch if the vehicle speed is higher than the predetermined speed. As a result, an extremely large torque is exerted on the transmission in the opposite direction, so that the engine is subjected to a large load, which may cause stallings of the engine.

SUMMARY OF THE INVENTION

The object of the present invention is to provide a system for controlling the clutch at the loading shift so that stalling of the engine may be prevented.

According to the present invention, there is provided a system for controlling an automatic clutch of a motor vehicle having a transmission and a shift lever for selecting a forward driving range or rearward driving range, the system comprising shift position detector means responsive to the selection of the forward driving range or the rearward driving range for producing a forward driving range signal or a rearward driving range siganal, loading shift detector means responsive to the shifting of the shift lever from the forward driving range to the rearward driving range or from the rearward driving range to the forward driving range for producing a loading shift signal, accelerator pedal detector means for detecting releasing of an accelerator pedal of the vehicle and for producing an accelerator pedal release signal, speed detector means for detecting vehicle speed and for producing a speed signal when the engine speed is higher than a predeterminedd clutch engaging speed, means responsive to the loading shift signal, the accelerator pedal release signal and the speed signal for producing an engine stall signal.

In response to the engine stall signal, the clutch is disengaged.

In an aspect of the present invention, the automatic clutch is an electromagnetic clutch and the transmission is an automatic transmission.

The other objects and features of this invention will be understood from the following description with reference to the accompanying drawings.

BRIEF DESCRIPTION OF DRAWINGS

FIGS. 2a and 2b show a block diagram of a control unit according to the present invention;

FIGS. 4a and 4b comprise a flowchart showing the operation of a control system according to the present invention.

DETAILED DESCRIPTION OF THE PREFERRED EMBODIMENT

Figure 1:
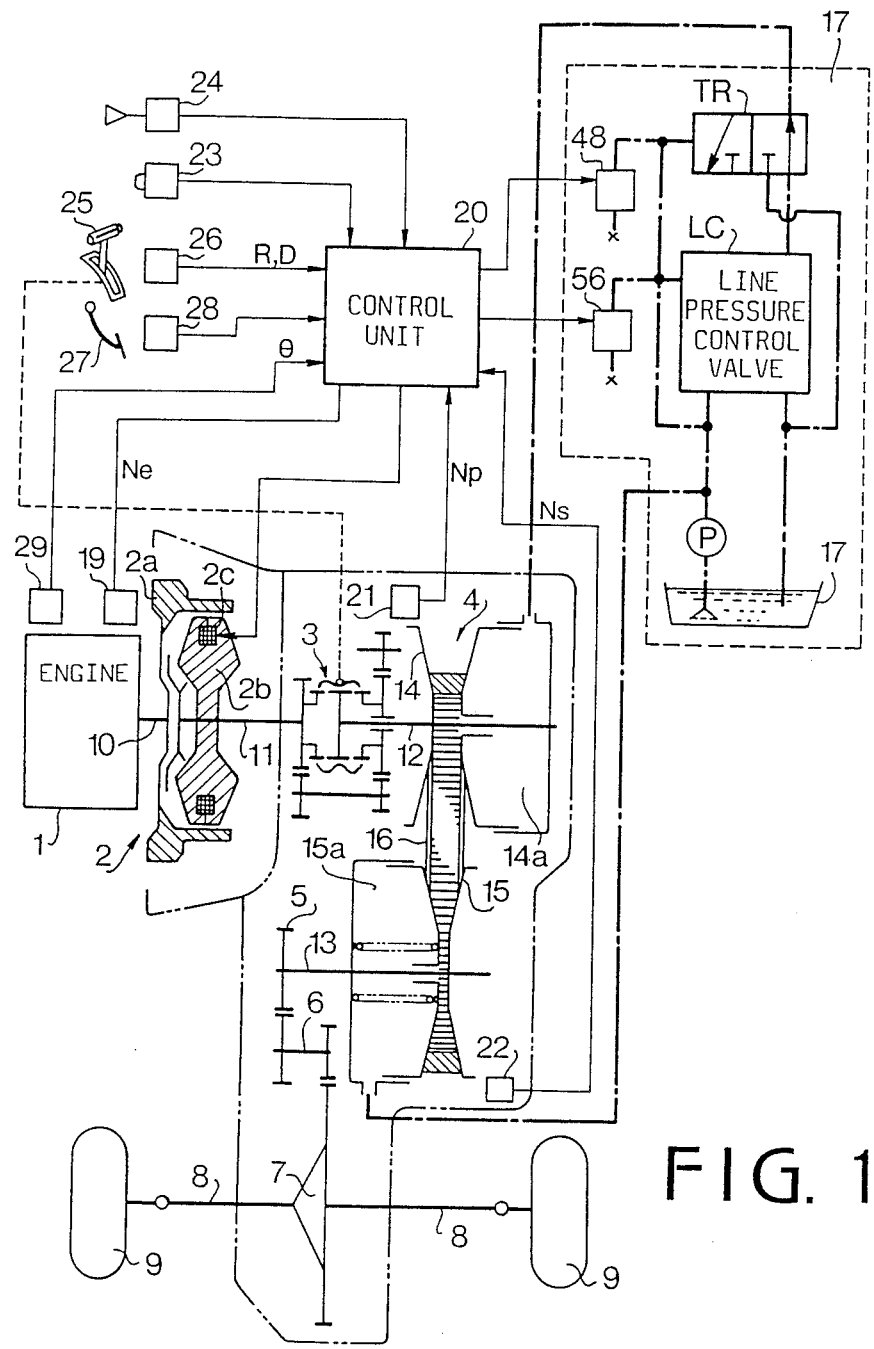
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive automatic transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D-range), high engine speed driving position (Ds-range) and a reverse driving position (R-range).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. The hydraulic cylinders 14a and 15a are communicated with a hydraulic control circuit 17. The cylinder 14a is supplied with pressurized oil by an oil pump P from an oil reservoir through a line pressure control valve LC and a transmission ratio control valve TR. The cylinder 15a is supplied with pressurized oil from the pump P through the line pressure control valve LC. The hydraulic control circuit 17 is responsive to vehicle speed, engine speed and throttle valve position for controlling the amount of oil supplied to the cylinders 14a and 15a. The pulleys 14 and 15 are operated by compressive force of the cylinders 14a and 15a so that a running diameter of the belt 16 varies to infinitely change the transmission ratio of the transmission.

An electronic control system for the clutch 2 and the belt-drive transmission 4 has an engine speed sensor 19, and rotating speed sensors 21 and 22 for respectively sensing rotating speeds of the drive pulley 14 and the driven pulley 15. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing the drive positions D and Ds and the reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal which is transmitted to the clutch 2 and a control signal for controlling the transmission ratio (i) and a line pressure control signal which is transmitted to the control circuit 17.

Figure 2B:
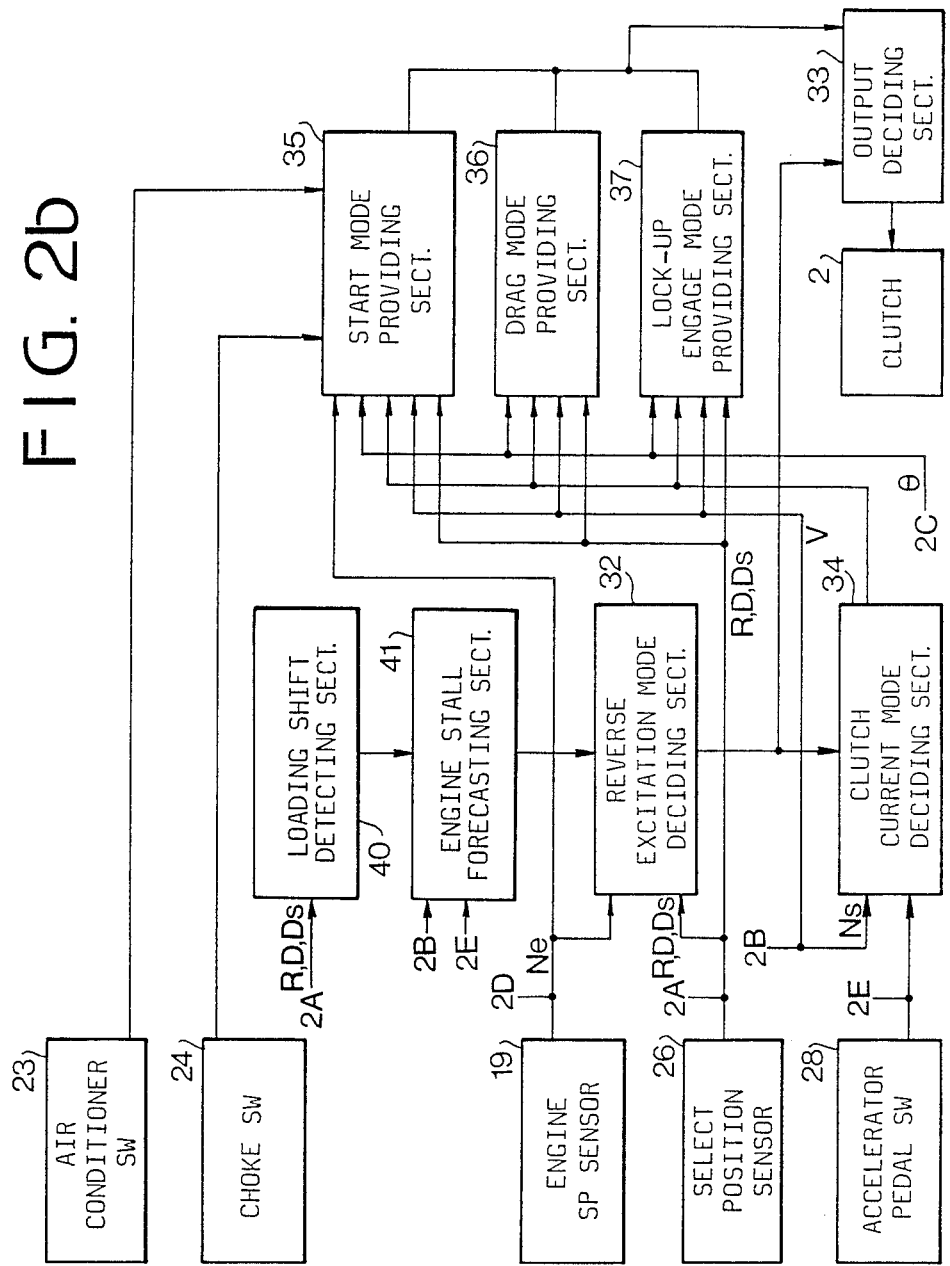

Referring to FIGS. 2a and 2b showing the control unit 20 of FIG. 1, a transmission ratio changing speed (rate) control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed (rate) di/dt. A line pressure control section 31 is applied with an engine speed signal Ne of the sensor 19, throttle position signal $\theta$ of the sensor 29, and actual transmission ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with engine speed signal Ne of the sensor 19 and drive position signals of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the coil 2C of the clutch 2 to release the clutch completely.

A clutch current mode deciding section 34 is applied with signals from the reverse excitation mode deciding section 32 and accelerator pedal switch 28, and vehicle speed signal V from the driven pulley speed sensor 22 for deciding driving conditions such as a starting mode to produce output signals. The output signals are applied to a start mode providing section 35, drag mode providing section 36, and clutch lock-up engage mode providing section 37.

The start mode providing section 35 decides the clutch current of a starting characteristic dependent on the engine speed Ne at an ordinary start or at closing of the choke switch 24 or at closing of the air conditioner switch 23. The starting characteristic is corrected by signals from the throttle valve opening degree $\theta$, vehicle speed V, and driving positions of D-range and Ds-range and R-range.

The drag mode providing section 36 decides a small drag current when the accelerator pedal 27 is released at a low speed in each drive position for providing a drag torque to the clutch 2 for the reduction of clearances formed in the transmission and for the smooth start of the vehicle.

Figures 3, 5:
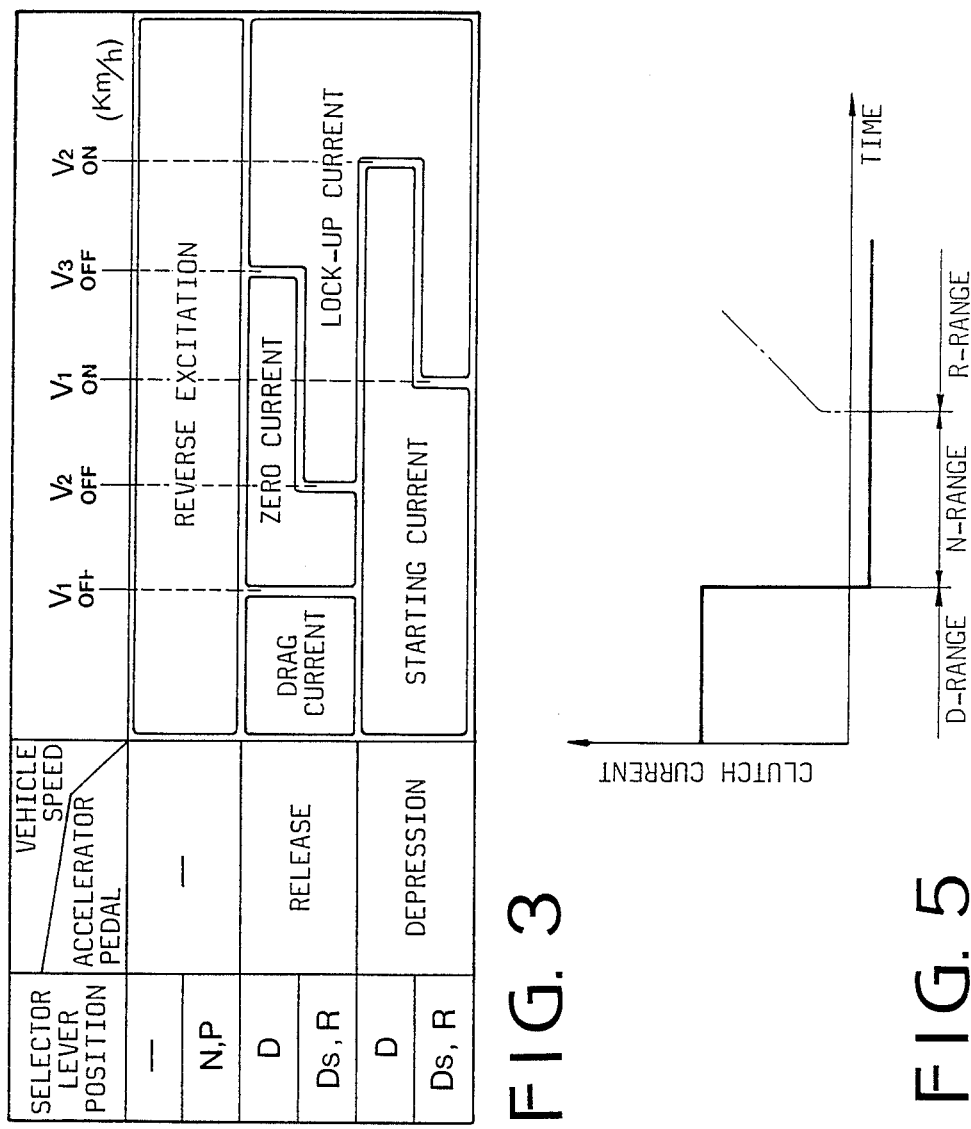
FIG. 3 is a graph showing regions of various modes.
FIG. 5 is a graph showing clutch current characteristics.

The clutch lock-up engage mode pivoting section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

A system for preventing stalling of the engine at the loading shift is described.

The control unit 20 has a loading shift detecting section 40 to which drive position signals of the select position sensor 26 are applied. The loading shift detecting section 40 produces a loading shift signal when the driving position changes from D-range or Ds-range to R-range and vice versa. The loading shift signal is fed to an engine stall forecasting (deciding) section 41 to which vehicle speed V and an accelerator pedal release signal from the accelerator pedal 28 are also fed. If the vehicle speed V is higher than a predetermined clutch engaging vehicle speed Vs at which the clutch 2 is engaged completely (V≧Vs), and the accelerator pedal is released when the loading shift signal is applied, the engine stall forecasting section 41 applies an engine stall signal to the reverse excitation mode deciding section 32, so that the coil 2C of the clutch 2 is reversely excited to release the clutch.

The operation of the system will be described hereinafter with reference to FIGS. 4a, 4b and 5.

At the D-range, when the accelerator pedal is depressed, the clutch current node deciding section 34 applies a signal to the start mode providing section so that the clutch current for starting the vehicle flows in the coil 2C of the clutch 2. When vehicle speed reaches a predetermined speed, a signal is applied to the lock-up engage mode providing section 37 so that a large lock-up current for entirely engaging the clutch flows as shown in FIG. 5 to lock up the clutch 2. When the accelerator pedal is not depressed at the D-range, a small drag current flows.

Figure 4B:
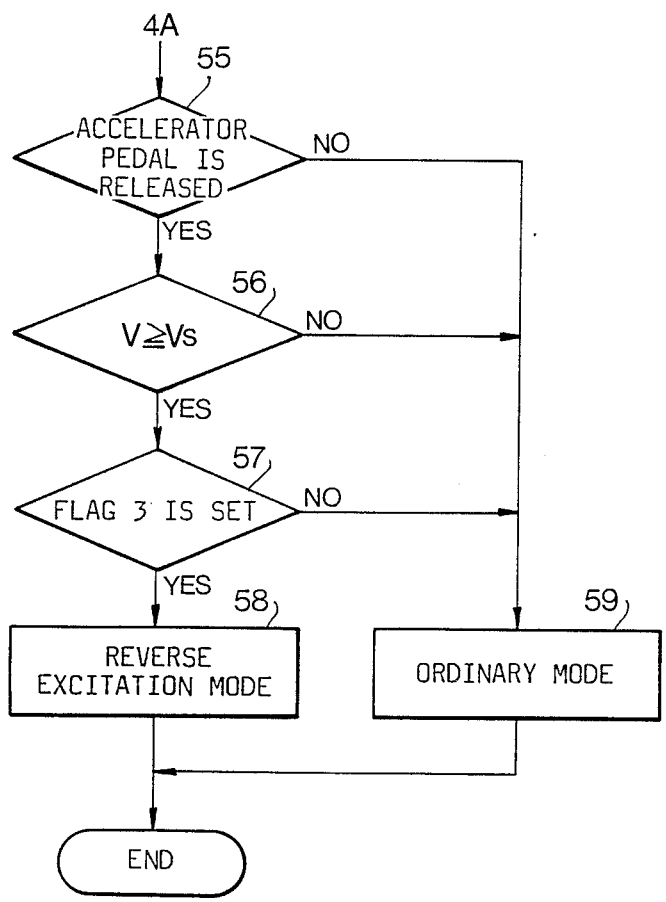

When the selector lever 25 is shifted, the output signal of the shift position sensor 26 is fed to the loading shift detecting section 40 to execute the operation described in the flowchart of FIGS. 4a and 4b.

If the selected position is determined as the D-range at a step 50, a flag 1 is set at a step 51. It is determined at a step 52 whether the selected range at the last program was the R-range, namely whether a flag 2 for indicating the R-range has been set. When the flag 2 is not set, the program goes to a step 55 where it is determined whether the accelerator pedal is released. If the pedal is depressed, ordinary mode is selected at a step 59, thereby controlling the clutch as hereinbelow described.

When the shift range is not the D-range upon the determination at the step 50, the program proceeds to a step 60. When the R-range is determined at the step 60, the flag 2 is set at a step 61. At a step 62, when it is determined that the flag 1 was set at the last program, that is, when the loading shift is determined, a flag 3 is set at a step 63. The loading shift signal from the loading shift detecting section 40 is fed to the engine stall forecasting section 41, and the flag 1 is reset at a step 64.

When it is determined that the accelerator pedal 27 is depressed at the step 55, the program goes to the step 59. Therefore, a starting current flows in the clutch as shown by the dot-dash line in FIG. 5, for starting the vehicle in the reverse direction. When it is determined that the accelerator pedal 27 is released at the step 55, it is determined at a step 56 whether the vehicle speed V is higher than the predetermined clutch engaging speed Vs. When the vehicle speed V is higher than Vs, and when it is determined that the flag 3 is set at a step 57, the reverse excitation mode is selected at a step 58. Namely, the engine stall forecasting signal is applied to the reverse excitation mode deciding section 32 so that a reverse clutch current flows as shown by a solid line in FIG. 5, thereby releasing the clutch. Consequently, at the loading shift, the engine is cut off from the power train so that load is not exerted thereon. Thus, the vehicle coasts until the accelerator pedal is depressed or the vehicle is decelerated by depressing a brake pedal.

When it is determined at the step 52 that the flag 2 is set, the flag 3 is set at a step 53, so that the loading shift signal is produced and at a step 54 the flag is reset. Thereafter, the reverse excitation mode or the ordinary mode is selected at step 58 or 59 in dependency on the conditions of the accelerator pedal and vehicle speed as described above.

When the Ds-range is selected, the transmission is downshifted, so that the engine speed is increased. Consequently, there is little possibility that the engine stalls. Accordingly, if it is determined at a step 65 that the Ds-range is selected, the flags 1, 2 and 3 are reset at a step 66 so that the program goes to the step 59 through the step 57 at the latest despite the loading shift.

In the presently described embodiment, since the clutch engaging vehicle speed in the D-range differs from the speed in the R-range as shown in FIG. 3, the predetermined clutch engaging speed Vs at the step 56 is changed in accordance with the selected range.

In accordance with the present invention, the electromagnetic clutch is disengaged at the loading shift so that stalling of the engine is effectively prevented. When the accelerator pedal is depressed after the loading shift, an ordinary mode is selected in accordance with the intention of the driver, thereby enabling the driving of the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for controlling an automatic clutch of a motor vehicle having a transmission for transmitting power of an engine to a driving wheel of the vehicle, the clutch being engaged when vehicle speed is higher than a predetermined clutch engaging vehicle speed, a shift lever for selecting a forward driving range or a rearward driving range of said transmission, a shift position detector for detecting said ranges and for producing a forward driving range signal or a rearward driving range signal, respectively, an accelerator pedal position sensor for detecting a position of an accelerator pedal for producing an accelerator pedal releasing signal when the accelerator pedal is released, a vehicle speed detector for sensing vehicle speed and for producing a corresponding vehicle speed signal, and an engine speed sensor for detecting engine speed for producing a corresponding engine speed signal, the improvement of the system which comprises:

a loading shift detector responsive to said rearward driving range signal for producing a loading shift signal;

engine stall deciding means responsive to said loading shift signal, said accelerator pedal releasing signal and said vehicle speed signal for producing an engine stall signal when said vehicle speed is higher than said predetermined clutch engaging vehicle speed;

reverse excitation mode deciding means responsive to said engine stall signal, said rearward driving range signal and said engine speed signal for producing a reverse excitation signal to immediately release said clutch completely so as to prevent engine stall when said clutch is released for shifting to said rearward range while driving said vehicle at a higher speed than said predetermined clutch engaging vehicle speed; and clutch current mode deciding means responsive to said reverse excitation signal, said vehicle speed signal and said accelerator pedal releasing signal for controlling said clutch in a suitable mode for driving conditions.

2. The system according to claim 1 wherein the automatic clutch is an electromagnetic clutch.

3. The system according to claim 1 wherein the predetermined clutch engaging vehicle speed is changed in accordance with the selected driving range vehicle.

4. A system for controlling an automatic clutch of a motor vehicle having a transmission for trasnsmitting power of an engine to a driving wheel of the vehicle, the clutch being engaged when vehicle speed is higher than a predetermined clutch engaging vehicle speed, a shift lever for selecting a forward driving range or a rearward driving range of said transmission, a shift position detector for detecting said ranges and for producing a forward driving range signal or a rearward driving range signal, respectively, an accelerator pedal position sensor for producing an accelerator pedal releasing signal when the accelerator pedal is released, and a vehicle speed detector for sensing vehicle speed and for producing a corresponding vehicle speed signal, the improvement of the system which comprises:

a loading shift detector responsive to change from said forward driving range signal to said rearward driving range signal or vise versa for producing a loading shift signal;

engine stall deciding means responsive to said loading shift signal, said accelerator pedal releasing signal and said vehicle speed signal for producing an engine stall signal when said vehicle speed is higher than said predetermined clutch engaging vehicle speed;

reverse excitation mode deciding means responsive to said engine stall signal for producing a reverse excitation signal to immediately release said clutch completely, so as to prevent engine stalling when said accelerator pedal is released for shifting from said forward driving range to said rearward driving range of visa versa while driving said vehicle at a higher speed than said predetermined clutch engaging vehicle speed.

* * * * *